US011334476B2

(12) United States Patent
Sachdev et al.

(10) Patent No.: US 11,334,476 B2
(45) Date of Patent: May 17, 2022

(54) CLIENT-SIDE SURVEY CONTROL

(71) Applicant: Microsoft Technology Licensing, LLC, Redmond, WA (US)

(72) Inventors: Neelanjana Sachdev, Redmond, WA (US); Si Latt, Bellevue, WA (US); Ramesh T. Bangalore, Redmond, WA (US); Charles D. McClintock, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 911 days.

(21) Appl. No.: 15/471,391

(22) Filed: Mar. 28, 2017

(65) Prior Publication Data

US 2018/0285102 A1 Oct. 4, 2018

(51) Int. Cl.
  *G06F 11/36* (2006.01)
  *G06Q 30/02* (2012.01)
  *G06F 11/30* (2006.01)

(52) U.S. Cl.
  CPC ..... *G06F 11/3692* (2013.01); *G06Q 30/0203* (2013.01); *G06F 11/302* (2013.01); *G06F 2201/86* (2013.01)

(58) Field of Classification Search
  CPC ........ G06Q 10/00–50/00; G06F 1/00–2201/00
  USPC ..................... 705/7.32, 7.11–7.42
  See application file for complete search history.

(56) References Cited

U.S. PATENT DOCUMENTS

| | | | |
|---|---|---|---|
| 7,587,484 B1 * | 9/2009 | Smith | H04L 67/22 709/224 |
| 2001/0037206 A1 | 11/2001 | Falk et al. | |
| 2002/0007303 A1 | 1/2002 | Brookler et al. | |
| 2002/0128898 A1 * | 9/2002 | Smith, Jr. | G06Q 30/0203 705/7.32 |
| 2002/0147850 A1 * | 10/2002 | Richards | H04L 67/10 709/248 |
| 2002/0188777 A1 | 12/2002 | Kraft et al. | |
| 2005/0075919 A1 | 4/2005 | Kim | |
| 2005/0100158 A1 * | 5/2005 | Kreiner | H04M 3/5166 379/265.02 |
| 2006/0257839 A1 * | 11/2006 | Miyaji | G06Q 30/02 434/323 |
| 2007/0192161 A1 * | 8/2007 | Kogan | G06Q 30/0203 705/7.32 |
| 2008/0214162 A1 | 9/2008 | Ramer et al. | |

(Continued)

*Primary Examiner* — Alan S Miller
(74) *Attorney, Agent, or Firm* — Michael Best & Friedrich LLP

(57) ABSTRACT

Systems and methods for controlling delivery of surveys associated with a software application at a client device. One system includes a client device having an interface, a memory, and an electronic processor. The interface is configured to receive a survey including a survey item and a survey rule defining when the survey item is to be delivered to a user of the client device. The memory is configured to store the survey. The electronic processor is configured to execute the software application and receive a log of events associated with the execution of the software application. The electronic processor is also configured to access the survey stored in the memory, determine when the log of events satisfies the survey rule, and deliver the survey item to the user in response to the log of events satisfying the survey rule.

16 Claims, 4 Drawing Sheets

(56) References Cited

U.S. PATENT DOCUMENTS

| | | | |
|---|---|---|---|
| 2009/0298480 A1* | 12/2009 | Khambete | G06F 16/9535 |
| | | | 709/224 |
| 2010/0088156 A1 | 4/2010 | Wilson | |
| 2010/0174974 A1 | 7/2010 | Brisebois et al. | |
| 2011/0145279 A1 | 6/2011 | Chunilal | |
| 2012/0011006 A1 | 1/2012 | Schultz et al. | |
| 2012/0016719 A1* | 1/2012 | Meyer | G06Q 30/02 |
| | | | 705/7.32 |
| 2012/0284324 A1* | 11/2012 | Jarville | G06Q 30/0201 |
| | | | 709/203 |
| 2014/0108494 A1* | 4/2014 | Kahlert | G06Q 30/02 |
| | | | 709/203 |
| 2014/0278783 A1 | 9/2014 | Du | |
| 2014/0324541 A1 | 10/2014 | Malik et al. | |
| 2016/0063787 A1 | 3/2016 | Lang et al. | |
| 2016/0274875 A1 | 9/2016 | Farooqi | |
| 2016/0358495 A1* | 12/2016 | Bushell | G09B 7/06 |
| 2017/0091787 A1* | 3/2017 | Choudhari | G06F 16/245 |
| 2017/0220817 A1* | 8/2017 | Shen | H04L 63/1475 |
| 2018/0040002 A1* | 2/2018 | Tierney | H04W 4/02 |

\* cited by examiner

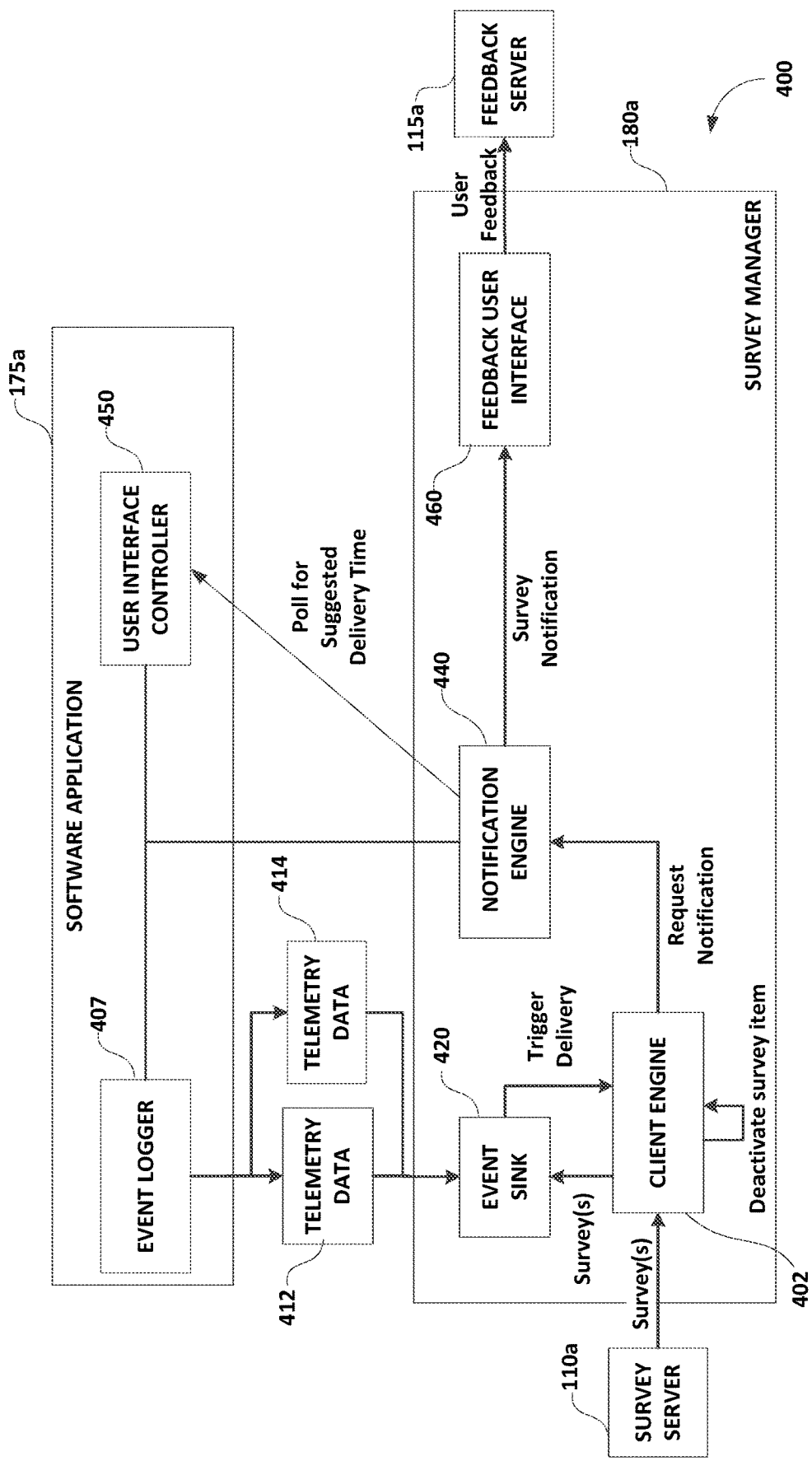

CLIENT-SIDE SURVEY CONTROL

FIELD

Embodiments described herein relate to controlling delivery of surveys on a client device.

SUMMARY

Software providers routinely request feedback from users to test new software, ensure user satisfaction, and determine software updates and improvements. This feedback may be collected through one or more surveys. To obtain meaningful information through a survey, surveys may be delivered to particular users based on how the user uses or interacts with a particular software application. For example, a cloud server may request information regarding how a user uses a particular software application to determine when to deliver a survey. Such a configuration, however, requires communication between a user device and the cloud server. When communication between the cloud server and a user device is not available, such as when the user device is offline or the cloud server is unavailable, the cloud server is unable to track how a user is using a particular software application. Therefore, the cloud server may miss an opportunity to obtain valuable feedback from a user.

Accordingly, embodiments described herein provide client-side control of survey delivery. Controlling survey delivery at a client device allows appropriate surveys to be delivered even if an external remote server (such as a cloud server or service) is unavailable. In such embodiments, the client device determines when a survey should be delivered to a user based on how the user uses the software application. To control delivery of surveys, the client device locally stores surveys associated with a software application (as part of the software application or separate). Each stored survey may be associated with one or more rules. When the user's usage of or interaction with the software application satisfies one of the rules, one or more survey items (dialog boxes, check boxes, voting buttons, and the like) are delivered to the user. Accordingly, as described in more detail below, the client device uses the locally-stored surveys to deliver context-driven surveys that are appropriately timed based on how the user is using the software application to obtain valuable user feedback.

For example, one embodiment provides a system for controlling delivery of surveys within a software application at a client device. The system includes a client device having an interface, a memory, and an electronic processor. The interface is configured to receive a survey including a survey item and a survey rule defining when the survey item is to be delivered to a user of the client device. The memory is configured to store the survey. The electronic processor is configured to execute the software application, and receive a log of events associated with the execution of the software application. The electronic processor is also configured to access the survey stored in the memory, determine when the log of events satisfies the survey rule, and deliver the survey item to the user in response to the log of events satisfying the survey rule.

Another embodiment provides a method for controlling delivery of surveys at a client device. The method includes storing, in a memory of the client device, a plurality of surveys, each survey including a survey item and a survey rule defining when the survey item is to be displayed to the user. The method also includes executing, by an electronic processor of the client device, a software application, and receiving, by the electronic processor of the client device, a log of events associated with the software application as executed by the electronic processor of the client device. The method further includes determining, by the electronic processor, when the log of events satisfies a first survey rule of a first survey included in the plurality of surveys stored in the memory, and delivering, by the electronic processor, a first survey item associated with the first survey rule to the user in response to the log of events satisfying the first survey rule.

Yet a further embodiment provides non-transitory computer-readable medium containing instructions, that when executed, perform a set of functions. The set of functions include accessing a survey item associated with a survey rule stored in a storage device of a client device, receiving a log of events associated with a software application executed by the client device, and determining when the log of events satisfies the survey rule. The set of functions also includes delivering the survey item to a user in response to determining that the log of events satisfies the survey rule; receiving user feedback through the survey item, and transmitting the user feedback to a remote server.

BRIEF DESCRIPTION OF THE DRAWINGS

FIG. 4 is a block diagram of an implementation of a survey delivery system according to one embodiment.

DETAILED DESCRIPTION

Figure 1:
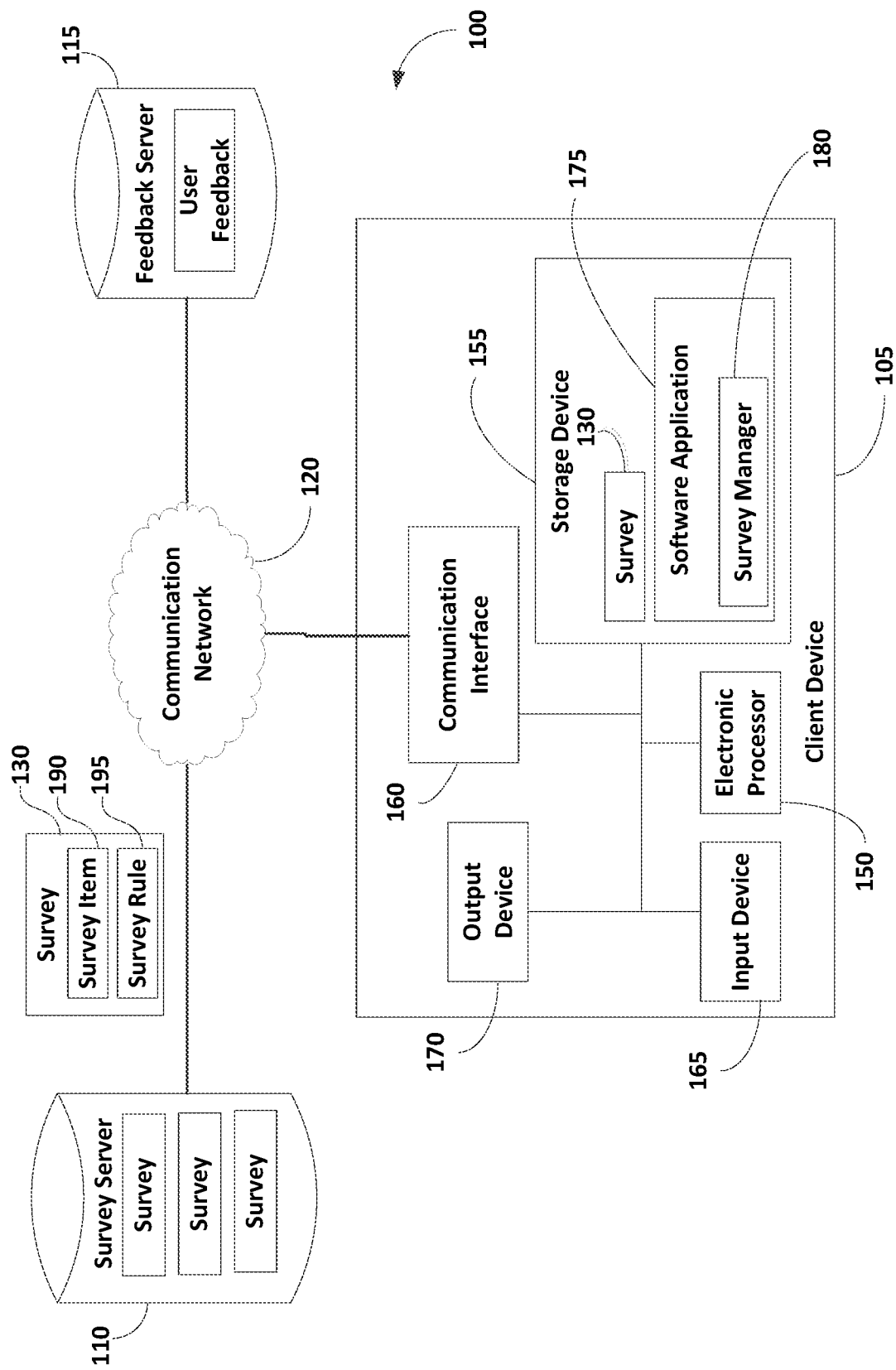
FIG. 1 is a block diagram of a survey delivery system according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, surveys are routinely delivered to users to obtain feedback regarding a software application. In some situations, a server (such as a cloud server providing cloud services) obtains data representing how a user uses the software application from a client device. Based on the received data, the server determines whether a particular survey should be delivered to the client device for display to the user. For example, the server may deliver a survey to a client device when a user operating the client device uses the software application in a predetermined way (for example, to perform or use a particular feature or function of the software application, to use the software application for a particular duration, and the like). As one example, the server may deliver a survey to a client device when the user operating the client device adds a table to a document file five times. In such a configuration, when the server is unavailable (for example, the server is down for maintenance, a communication network is unavailable, the client device is offline, or the like), the user's use of or interaction with the software application is not reported (or is not timely reported) to the server. Therefore, the server may miss an opportunity to deliver a survey to the user.

To address these and other problems, embodiments described herein provide systems and methods for providing client-side survey control. In these embodiments, the client device manages available surveys associated with one or more software applications, receives a log of events associated with one or more software applications, and determines when to deliver a survey to a user of the client device based on the log of events. In such implementations, the client device no longer needs a connection to an external device, such as a server, to timely deliver appropriate surveys. Rather, the client device continues to deliver surveys even when the client device is not in communication with an external device or one or more communication networks.

For example, FIG. 1 illustrates a system 100 for controlling delivery of a survey to a user. The system 100 facilitates the delivery of surveys to the user of a client device 105 to obtain user feedback related to one or more software applications executed by the client device 105. As used in the present application, the user feedback may relate to user feedback for one or more software applications, one or more features of a software application, or a combination thereof. Accordingly, although embodiments are described herein as receiving feedback for a software application, this feedback may similarly be associated with a particular feature within a software application, a set of features within a software application, a set of software applications, or a combination thereof.

As shown in FIG. 1, the client device 105 communicates with a survey server 110 and with a feedback server 115 over a communication network 120. It should be understood that in some embodiments the system 100 may include fewer or additional components in various configuration. For example, a single client device 105 is shown in FIG. 1 as one example and more or fewer client devices 105 may be included in the system 100. Also, in some embodiments, the system 100 may include multiple servers that provide the functionality of each of the servers 110, 115 described herein in a distributed or cloud-based fashion. In some embodiments, the survey server 110 and the feedback server 115 are incorporated as a single server providing the surveys and receiving the user feedback information.

The communication network 120 may be a wired network or a wireless network and may be implemented using a wide area network, such as the Internet, a local area network, such as Wi-Fi, or combinations or derivatives thereof. It should be understood that the client devices 105 and the servers 110, 115 may communicate over more than one communication network and different pairs of components may communicate over different networks. Also, in some embodiments, the client device 105 may communicate with the servers 110, 115 over a dedicated connection rather than a communication network.

Each client device 105 may be a computing device such as, for example, a laptop computer, desktop computer, tablet computer, smart phone, smart watch, and the like. As shown in FIG. 1, each client device 105 may include an electronic processor 150 (for example, a microprocessor, application-specific integrated circuit (ASIC), or another suitable electronic device), a storage device 155 (for example, a non-transitory, computer-readable storage medium), and a communication interface 160, such as a transceiver for communicating over the communication network 120, other communication networks, or a combination thereof.

As illustrated in FIG. 1, the client device 105 also includes an input device 165 and an output device 170. In other embodiments, the client device 105 may include multiple input devices 165 and output devices 170. The input device 165 receives input from a user of the client device 105. The input device 165 may include, for example, a keyboard, a pointer device, a touchscreen, a touchpad, and the like. Analogously, the output device 170 provides output to the user of the client device 105 and may include a display device, a touchscreen, a speaker, a vibration motor, and the like. In some embodiments, the client device 105 may include a single device that operates as both an input device and an output device, such as a touchscreen. It should be understood that the client device 105 may include additional components than those illustrated in FIG. 1 in various configurations and may perform additional functionality than the functionality described in the present application.

The electronic processor 150, the storage device 155, the communication interface 160, the input device 165, and the output device 170 communicate over one or more wired communication lines or buses or wirelessly. The storage device 155 stores software (instructions). For example, as illustrated in FIG. 1, the storage device 155 stores a software application 175 and an associated survey manager 180

(which, as illustrated in FIG. 1, may be included or embedded within the software application 175). It should be understood that, in some embodiments, the client device 105 may include more than one storage device and the software application 175 and the associated survey manager 180 may be stored in separate storage devices. Additionally, although a single software application 175 is illustrated in FIG. 1, it should be understood that the storage device 155 may include multiple software applications with or without an associated survey manager. The storage device 155 may also store data such as, for example, a survey 130 as shown in FIG. 1.

The electronic processor 150 included in the client device 105 is configured to retrieve software from the storage device 155 and execute, among other things, the software. As described in more detail below, the electronic processor 150 is configured to execute the software application 175 and is configured to execute the survey manager 180 to determine when to deliver one or more surveys to the user operating the client device 105 based on how the user uses the software application 175. In particular, the electronic processor 150 may access the survey 130 as part of executing the survey manager 180 to determine when to deliver a survey to a user.

Through the communication interface 160, the client device 105 communicates with the feedback server 115 via the communication network 120 to provide user feedback obtained through the survey 130 and communicates with the survey server 110 via the communication network 120 to receive one or more surveys 130 for receiving user feedback. The survey 130 may include one or more survey items 190 (for example, one or more survey questions, prompts, voting boxes, or the like) and one or more associated survey rules 195. A survey rule 195 defines one or more conditions under which one or more survey items 190 are delivered to a user. For example, a survey rule 195 may indicate that one or more associated survey items 190 should be delivered to a user in response to detection of a particular event (for example, upon occurrence of a particular event). As used in the present application, an event includes, but is not limited to, activation or deactivation of a software application or a feature therein, use of a software application or a feature therein, errors generated by a software application, a duration of use of a software application or a feature therein, and the like. Accordingly, a survey rule 195 may define or include a single event, a particular sequence of events, a particular event or sequence of events occurring a predetermined number of times (for example, a repeated occurrence of the particular event), and the like. Also, a survey rule 195 may include one or more events associated with a single software application or one or more events associated with multiple software applications (for example, a survey rule 195 may include an event from a first software application and another event from a second, different software application).

The survey server 110 stores a plurality of surveys 130, wherein each survey 130 includes at least one survey item 190 and at least one survey rule 195. In some embodiments, the survey server 110 may be associated with a specific software application 175 and may store and provide surveys 130 related to only the associated software application 175. In other embodiments, the survey server 110 stores and provides surveys 130 for a variety of different software applications. As mentioned above, the survey server 110 transmits at least one survey 130 to the client device 105 over the communication network 120. In some embodiments, the survey server 110 transmits surveys 130 to the client device 105 on a predetermined schedule (for example, daily, weekly, and the like). Alternatively or in addition, the survey server 110 may transmit a survey 130 to the client device 105 in response to a request from the client device 105 or another device, such as an administrator or developer console.

Figure 2:
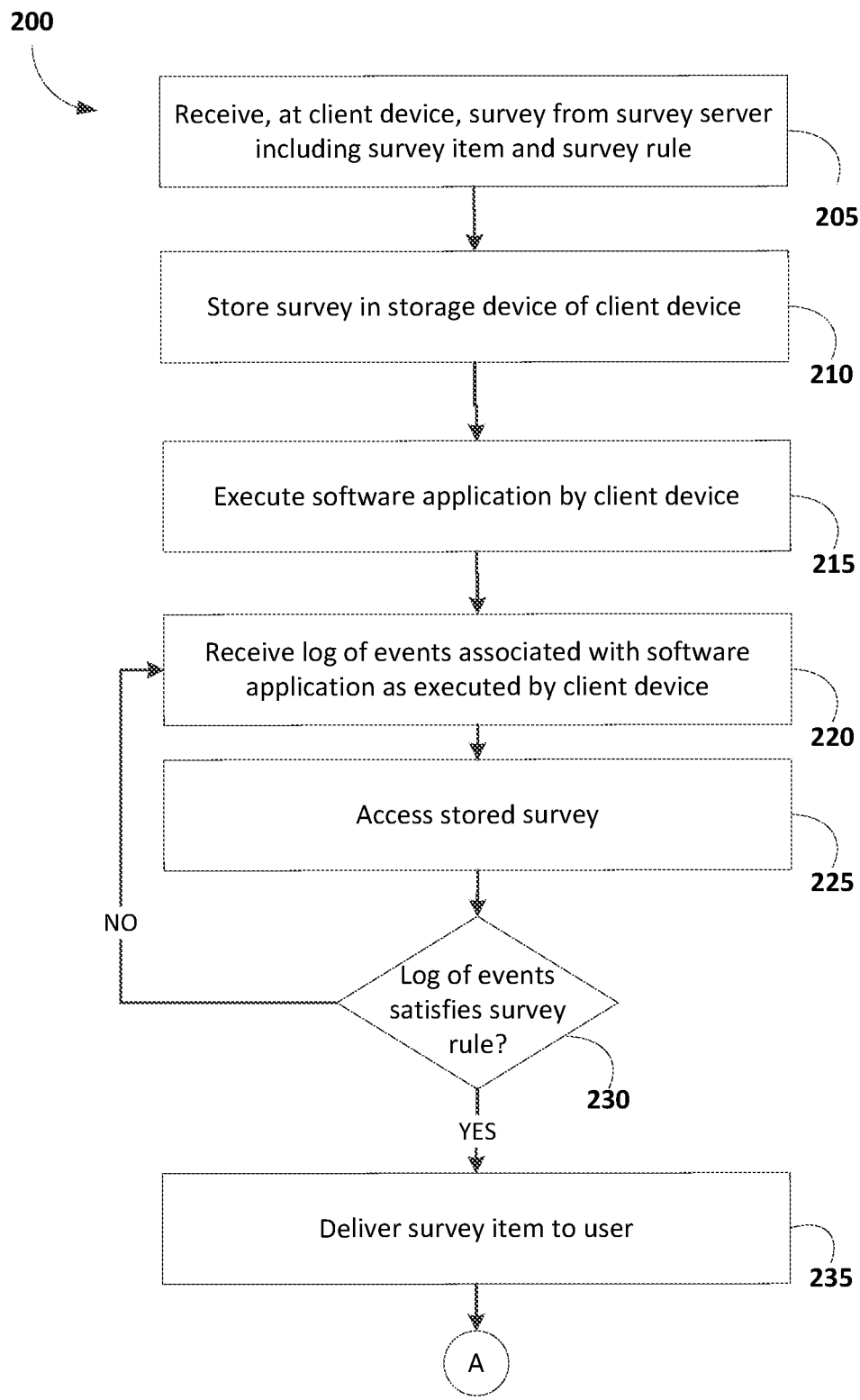
FIG. 2 is a flowchart illustrating a method of delivering a survey performed by the system of FIG. 1 according to one embodiment.

FIG. 2 is a flowchart illustrating a method 200 of controlling the delivery of surveys to a user at the client device 105. As shown in FIG. 2, the method 200 includes receiving, at the client device 105, a survey 130 from the survey server 110 (block 205). As described above, the client device 105 receives the survey 130 through the communication network 120. After receiving the survey 130, the electronic processor 150 included in the client device 105 stores the survey 130 (in particular, the survey item 190 and the survey rule 195) in the storage device 155 (block 210). As noted above, in some embodiments, the client device 105 may receive and store multiple surveys 130 for one or more software applications.

As illustrated in FIG. 2, the electronic processor 150 also executes the software application 175 (block 215). It should be understood that the two steps described above (that is, receiving a survey 130 and storing the survey 130) may be performed independent of the execution of the software application 175. In other words, the client device 105 may receive the survey 130 from the survey server 110 before, during, or after the electronic processor 150 executes the software application 175. Also, in some embodiments, one or more surveys 130 may be pre-stored on the storage device 155.

Based on the execution of the software application 175 by the electronic processor 150, the electronic processor 150 receives a log of events associated with the software application 175 (block 220). The log of events describe how the user uses or interacts with the software application 175 and provides insight into whether the software application 175 is being used, what features of the software application 175 are being used, how frequently features of the software application 175 are being used, what errors are occurring, and the like. For example, the log of events may track when the software application 175 is used, what features of the software application 175 are used, when features are used, and the like. The log of events may additionally or alternatively indicate a length of active use of the software application 175 or a specific feature of the software application 175.

As illustrated in FIG. 2, the electronic processor 150 also accesses the survey 130 stored in the storage device 155 (block 225). For example, the electronic processor 150 may execute the survey manager 180 to access the survey 130. The electronic processor 150 compares a survey rule 195 included in the survey 130 to log of events to determine whether the log of events satisfies the survey rules 195 (block 230).

As discussed above, the survey rule 195 may correspond to a particular event (for example, a user generating a chart type "A" within a spreadsheet application). When the log of events indicates that this particular event has occurred, the electronic processor 150 determines that the log of events satisfies the survey rule 195. In some examples, the survey rule 195 may specify a particular event occurring a predetermined number of times (for example, generating a chart type "A" eight times within a spreadsheet application). In such examples, the electronic processor 150 may process the log of events of identify whether the event has occurred the predetermined number of times. Alternatively or in addition, the electronic processor 150 may track the number of times a particular event occurs by initiating a count and increasing the count each time the log of events includes that the event has occurred (for example, the count increases each time the user generates a chart type "A" within a spreadsheet application). When the count corresponds to or exceeds the predetermined number of times specified by the survey rule 195, the electronic processor 150 determines that the log of events satisfies the survey rule 195. In some embodiments, the survey rule 195 may also indicate a minimum duration of active use of the software application 175 or of a feature of the software application 175. In such examples, the log of events may indicate, for example, a start time and an end time for use of the software application 175 or a feature of the software application 175, and the electronic processor 150 may calculate, using the start time and end time, a duration of use, which the electronic processor 150 compares to the log of events. In other embodiments, the log of events may include a duration of use of the software application 175 (rather than or in addition to start and end times). In either embodiment, when the duration corresponds to or exceeds the minimum duration of use specified by the survey rule 195, the electronic processor 150 determines that the log of events satisfies the survey rule 195.

In some embodiments, the electronic processor 150 periodically receives the log of events for the software application 175 (for example, continuously, every one minute, every five minutes, and the like). The electronic processor 150 may process the received log of events to determine whether any events included in the log of events are relevant to the stored survey rules 195, and compares the relevant events to the survey rules 195. Alternatively or in addition, the electronic processor 150 may process the stored survey rules 195 to determine the relevant events and may request the relevant events.

In some embodiments, the log of events is generated by the software application 175. Alternatively or in addition, in some embodiments, one or more separate applications may generate the log of events, such as an operating system of the client device 105. For example, the operating system of the client device 105 may be configured to handle user input and errors associated with the software application 175 and generate the log of events based on this data.

In some embodiments, the log of events includes telemetry data generated by the software application 175. The telemetry data may include standard events logged by the software application 175 for general consumption or use (for example, the operating system, audit logs, and the like). In other embodiments, the telemetry data may represent events specifically logged for use with surveys. For example, the software application 175 may include embedded code that logs events specific to surveys (for example, in a format that corresponds to one or more survey rules 195). Embedding such code in the software application 175, however, may introduce complexity. For example, this embedded code may need to be updated each time a new survey 130 is deployed, which increases code development and maintenance costs and forces software developers to plan surveys in advance (for example, before they understand how the software application 175 may be commonly used). Thus, in some embodiments, standard telemetry data generated for the software application 175 may be used to manage survey delivery to avoid or lessen the need for specifically-developed code within the software application 175.

As illustrated in FIG. 2, in response to the log of events not satisfying a survey rule 195, the electronic processor 150 continues to receive and analyze the log of events (block 220). On the other hand, in response to the log of events satisfying a survey rule 195, the electronic processor 150 delivers the associated survey item 190 to the user (block 235). Delivering the survey item 190 may include displaying the survey item 190 on an output device 170 of the client device 105 (for example, within a user interface of the software application 175). Delivering the survey item 190 may also include generating a notification of the survey item 190. The notification may prompt the user whether he or she wants to view and respond to the survey item 190, wants to ignore the survey item 190, or wants to postpone the survey item 190. In some embodiments, the electronic processor 150 also determines, before delivering the survey item 190, a desired time to deliver the survey item 190. The electronic processor 150 may determine the desired time based on, for example, the user's current or recent interaction with the software application 175, the number of software applications open, or the like. For example, the electronic processor 150 may delay delivering the survey item 190 to the user until the user has completed a current task (for example, finishes current edits) or takes a predetermined action (for example, saves a file, closes a file, and the like). In particular, the electronic processor 150 may control and regulate delivery of the survey item 190 (for example, within the software application 175) to not unnecessarily interrupt the user and to provide a streamlined experience for the user.

Figure 3:
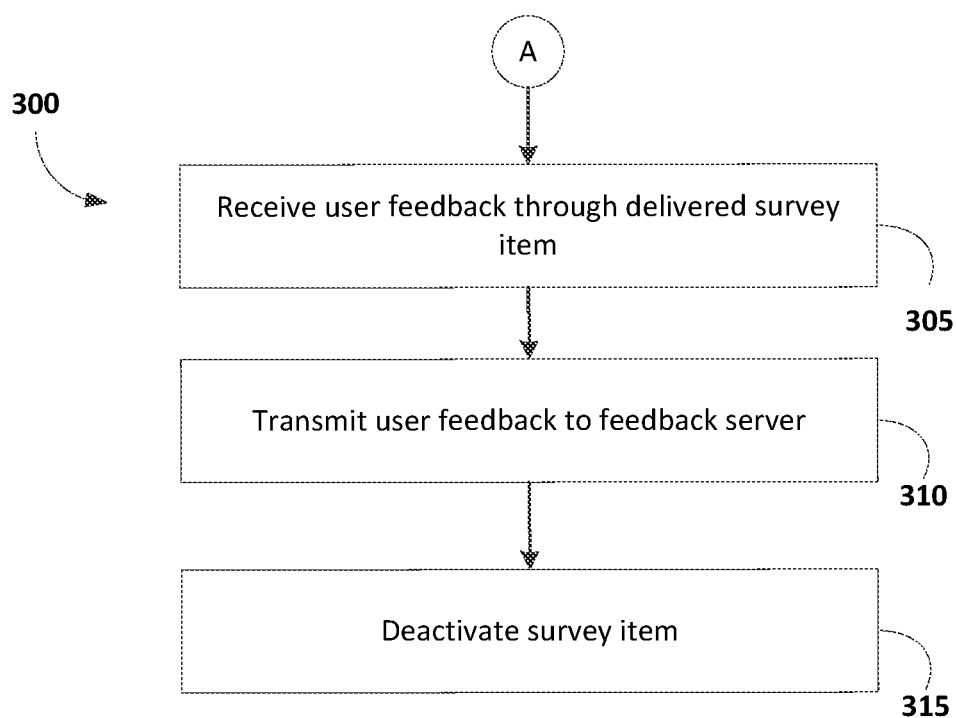
FIG. 3 is a flowchart illustrating a method of receiving user feedback through a survey performed by the system of FIG. 1 according to one embodiment.

When the survey item 190 is delivered to the user, the user may respond to the survey item 190 to provide user feedback (using an input device 165 of the client device). FIG. 3 illustrates a method 300 of managing user feedback received through a survey item 190. As shown in FIG. 3, after delivering the survey item 190 to the user, the electronic processor 150 receives the user feedback through the survey item 190 (block 305). The electronic processor 150 then transmits the user feedback to the feedback server 115 via the communication network 120 (block 310). As mentioned above, in some embodiments, the feedback server 115 and the survey server 110 are implemented as a single server.

In some embodiments, after a survey item 190 is delivered to a user or after the user responds to a delivered survey item 190, the electronic processor 150 deactivates the survey item 190 as stored in the storage device 155 (block 315). The electronic processor 150 deactivates the survey item 190 to prevent a survey item 190 from being repeatedly delivered to a user, which creates inefficiencies and may undermine the user's willingness to provide valuable feedback. In some embodiments, the electronic processor 150 deactivates the survey item 190 by flagging the survey item 190 as "used" within the storage device 155. In other embodiments, the electronic processor 150 deactivates the survey item 190 by deleting the survey item 190 from the storage device 155. The electronic processor 150 may deactivate a survey item 190 after the survey item 190 is delivered, after a user responds to a survey item 190, after the survey item 190 is delivered (or responded to) a predetermined number of times, or a combination thereof. For example, the electronic processor 150 may track (through a counter) a number of times a survey item 190 is delivered and may deactivate the survey item 190 in response to the survey item 190 being delivered the predetermined number of times. In addition to or in place of deactivating a survey item 190, the electronic processor 150 may deactivate a survey rule 195 associated with a survey item 190 to prevent unnecessary repetition of the survey item 190. For example, when a survey item 190 is associated with more than one survey rule 195, the electronic processor 150 may deactivate each survey rule 195 to prevent a used survey item 190 from being repeatedly delivered through different survey rules 195.

FIG. 4 illustrates one example implementation of a survey delivery system 400. The survey delivery system 400 is similar to the survey delivery system 100 of FIG. 1 and like parts have been given like reference numbers plus "a." As illustrated in FIG. 4, the survey delivery system 400 includes a plurality of software modules (such as the software application 175 and the survey manager 180). The electronic processor 150 of the client device 105, as explained above, executes these software modules. Also, it should be understood that the software modules illustrated in FIG. 4 may be combined and distributed in various configurations and FIG. 4 illustrates only one such configuration.

As shown in FIG. 4, and as described above, the survey manager 180a (a client engine 402 included in the survey manager 180a) receives one or more surveys 130 from the survey server 110a. The software application 175a (for example, through an event logger 407) logs events associated with the software application 175a, such as telemetry data associated with the software application 175a. In some embodiments, the telemetry data may include standard telemetry data 412 for the software application 175a (for example, data usable for other purposes than just survey control), survey-specific telemetry data 414 for the software application 175a, or a combination thereof. The survey manager 180a (an event sink 420 included in the survey manager 180a) receives the telemetry data and the surveys 130. The event sink 420 compares the received telemetry data with the survey rules 195 included in the received surveys 130. When the event sink 420 determines that received telemetry data satisfies a survey rule 195, the event sink 420 triggers delivery of a survey item 190 associated with the satisfied survey rule 195. In response, the client engine 402 requests a notification for the survey item 190 from a notification engine 440. The notification engine 440 creates a notification. In some embodiments, the notification engine 440 polls the software application 175a (for example, a user interface controller 450 included in the software application 175a) for a suggested (desired) delivery time for the notification. The notification engine 440 provides the requested notification (and the optional suggested delivery time) to a feedback user interface 460, which delivers the notification and the associated survey item 190 to the user. In response to receiving user feedback through the survey item 190, the feedback user interface 460 transmits the user feedback to the feedback server 115a. In some embodiments, the reviewer feedback is received through the software application 175a. In other embodiments, when the user agrees to provide feedback through a survey item 190, the user is redirected to a user interface for providing the feedback, which may be hosted by the feedback server 115a.

Accordingly, embodiments described herein allow a client device to receive surveys and locally manage delivery of such surveys even in situations when the client device is offline. Therefore, embodiments described herein identify more opportunities to obtain user feedback, and the availability of network connections and external devices does not negatively impact the delivery of contextual surveys.

Various features and advantages of some embodiments are set forth in the following claims.

What is claimed is:

1. A system for controlling delivery of surveys within a software application, the system comprising:
   a client device including:
      an output device,
      an interface configured to receive a survey item and a survey rule from a remote server prior to receiving a log of events including telemetry data generated by the software application when the software application is executed, the survey rule defining when the survey item or a notification of the survey item is to be delivered to the output device of the client device,
      a memory configured to store the survey item and the survey rule, and
      an electronic processor configured to:
         execute the software application,
         receive the log of events,
         access the survey item and the survey rule stored in the memory,
         determine, using an event sink, when the log of events satisfies the survey rule, and
         deliver the survey item or a notification of the survey item to the output device in response to the log of events satisfying the survey rule.

2. The system of claim 1, wherein the telemetry data is specifically generated by the software application for the survey.

3. The system of claim 1, wherein the telemetry data is standard telemetry data generated by the software application.

4. The system of claim 1, wherein the electronic processor is further configured to receive a response to the survey item from a user and transmit the response to the remote server via the interface.

5. The system of claim 4, wherein the electronic processor is further configured to deactivate the survey item after receiving the response.

6. The system of claim 1, wherein the survey rule includes at least one selected from a group consisting of an occurrence of a predetermined event within the software application, a length of active use of the software application, a repeated occurrence of a predetermined event with in the software application a predetermined number of times, and an occurrence of a predetermined sequence event within the software application.

7. The system of claim 1, wherein the survey rule includes a first event associated with the software application and a second event associated with a second software application.

8. The system of claim 1, wherein the electronic processor is configured to determine, using an event sink, when the log of events satisfies the survey rule by increasing a count of an event based on the log of events and comparing the count to a predetermined number of times to determine whether the log of events satisfies the survey rule.

9. A method for controlling delivery of a survey to a user on a client device, the method comprising:
   receiving, via an interface of the client device, a survey item and a survey rule from a remote server prior to receiving a log of events including telemetry data generated by the software application when the software application is executed by an electronic processor of the client device;
   storing, in a memory of the client device,
      the survey item and the survey rule, the survey rule defining when the survey item or a notification of the survey item is to be displayed by an output device of the client device;
   executing, by the electronic processor of the client device, the software application;
   receiving, by the electronic processor of the client device, a log of events;
   determining, using an event sink, when the log of events satisfies the survey rule; and
   delivering, by the electronic processor, the survey item associated with the survey rule or a notification of the survey item to an output device in response to the log of events satisfying the survey rule.

10. The method of claim 9, further comprising, receiving, by the electronic processor, user feedback through the survey item; and transmitting, via the interface of the client device, the user feedback to the remote server.

11. The method of claim 10, further comprising deactivating the survey item after receiving the user feedback through the survey item.

12. A non-transitory, computer-readable medium storing instructions, that when executed, perform a set of functions, the set of functions comprising:

receiving a survey item and a survey rule from a remote server prior to receiving a log of events including telemetry data generated by the software application when the software application is executed by a client device;

storing, in a storage device of the client device the survey item and the survey rule;

receiving the log of events;

determining, using an event sink, when the log of events satisfies the survey rule stored in the storage device;

delivering the survey item or a notification of the survey item to an output device in response to determining that the log of events satisfies the survey rule;

receiving user feedback through the survey item; and transmitting the user feedback to a second remote server.

13. The non-transitory, computer-readable medium of claim 12, wherein the survey rule includes at least one selected from a group consisting of an occurrence of a predetermined event within the software application, a length of active use of the software application, an repeated occurrence of a predetermined event with in the software application a predetermined number of times, and an occurrence of a predetermined sequence event within the software application.

14. The non-transitory, computer-readable medium of claim 12, wherein the set of functions further comprises deactivating the survey item and the survey rule in response to receiving the user feedback.

15. The non-transitory, computer-readable medium of claim 12, wherein the telemetry data is specifically generated for the survey.

16. The non-transitory, computer-readable medium of claim 12, wherein the telemetry data is standard telemetry data generated by the software application.

* * * * *